US 9,470,149 B2

United States Patent
Motakef et al.

(10) Patent No.: US 9,470,149 B2
(45) Date of Patent: Oct. 18, 2016

(54) TURBINE INLET AIR HEAT PUMP-TYPE SYSTEM

(75) Inventors: Abbas Motakef, Norcross, GA (US); Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 2078 days.

(21) Appl. No.: 12/332,383

(22) Filed: Dec. 11, 2008

(65) Prior Publication Data

US 2010/0146981 A1    Jun. 17, 2010

(51) Int. Cl.
*F02C 7/143*    (2006.01)
*F01K 27/02*    (2006.01)
*F02C 7/047*    (2006.01)
*F01K 23/10*    (2006.01)

(52) U.S. Cl.
CPC .............. *F02C 7/143* (2013.01); *F01K 27/02* (2013.01); *F02C 7/047* (2013.01); *F01K 23/10* (2013.01); *Y02E 20/14* (2013.01)

(58) Field of Classification Search
CPC ....... Y02E 20/14; Y02E 20/16; F01K 23/10; F02C 7/143; F25D 11/022; F25D 11/025; F25B 7/00; F25B 29/003; F25B 41/00; F25B 2339/047; F25B 30/06; Y02B 30/126; Y02B 30/625; B64D 2013/0696; F24H 4/04; F24F 5/0035
USPC ........ 60/39.182, 39.53, 728, 775; 62/79, 87, 62/98, 99, 113, 201, 238.1, 238.6, 238.7, 62/259.4, 401, 402, 513
See application file for complete search history.

(56) References Cited

U.S. PATENT DOCUMENTS

| 3,788,066 | A |   | 1/1974  | Nebgen |
|-----------|---|---|---------|--------|
| 3,796,045 | A | * | 3/1974  | Foster-Pegg ..................... 60/772 |
| 4,300,623 | A | * | 11/1981 | Meckler ........................ 165/210 |
| 4,315,404 | A |   | 2/1982  | Schmitt et al. |
| 4,519,207 | A |   | 5/1985  | Okabe et al. |
| 4,792,091 | A | * | 12/1988 | Martinez, Jr. .................. 237/19 |
| 4,951,460 | A | * | 8/1990  | Prochaska et al. ............. 60/791 |
| 5,203,161 | A |   | 4/1993  | Lehto |
| 5,351,487 | A | * | 10/1994 | Abdelmalek ................... 60/618 |
| 5,444,971 | A |   | 8/1995  | Holenberger |
| 6,318,065 | B1 |  | 11/2001 | Pierson |
| 6,408,609 | B1 | * | 6/2002  | Andrepont ..................... 60/772 |
| 6,470,686 | B2 |  | 10/2002 | Pierson |
| 6,532,754 | B2 |  | 3/2003  | Haley et al. |

(Continued)

FOREIGN PATENT DOCUMENTS

EP    0378003 A1    7/1990
WO    9709578 A2    3/1997

(Continued)

OTHER PUBLICATIONS

European Search Report from corresponding EP Application No. 09177607.0, Jun. 9, 2011.

*Primary Examiner* — Phutthiwat Wongwian
*Assistant Examiner* — Michael B Mantyla
(74) *Attorney, Agent, or Firm* — Sutherland Asbill & Brennan LLP

(57) ABSTRACT

A heating and cooling system for inlet air of a turbine compressor. The heating and cooling system may include a thermal energy storage tank charging loop, a cooling loop in communication with the thermal energy storage charging loop, and a heating loop in communication with the cooling loop and the inlet air of the turbine compressor.

14 Claims, 1 Drawing Sheet

(56) References Cited

U.S. PATENT DOCUMENTS

| | | |
|---|---|---|
| 6,769,258 B2 | 8/2004 | Pierson |
| 6,848,267 B2 | 2/2005 | Pierson |
| 6,964,168 B1 | 11/2005 | Person et al. |
| 7,343,746 B2 | 3/2008 | Pierson |
| 8,356,466 B2 * | 1/2013 | Motakef et al. ........... 60/39.182 |
| 8,601,825 B2 * | 12/2013 | Collins .............................. 62/93 |
| 8,776,517 B2 * | 7/2014 | Ernst et al. ..................... 60/616 |
| 8,973,379 B2 * | 3/2015 | Bittner et al. ..................... 62/79 |
| 8,991,202 B2 * | 3/2015 | Yabuuchi et al. ........... 62/238.1 |
| 9,016,083 B2 * | 4/2015 | Okuda et al. ................... 62/402 |
| 2002/0053196 A1 * | 5/2002 | Lerner et al. ............. 60/39.182 |
| 2003/0074901 A1 | 4/2003 | Bellac et al. |
| 2005/0056023 A1 * | 3/2005 | Pierson ........................... 60/772 |
| 2005/0103032 A1 | 5/2005 | Pierson |
| 2005/0223728 A1 * | 10/2005 | Stuhlmueller ............... 62/238.3 |
| 2007/0240400 A1 * | 10/2007 | Smith et al. ............... 60/39.182 |
| 2007/0248453 A1 | 10/2007 | Tetu et al. |
| 2007/0294984 A1 | 12/2007 | Chillar et al. |
| 2008/0098890 A1 | 5/2008 | Feher |
| 2008/0098891 A1 | 5/2008 | Feher et al. |

FOREIGN PATENT DOCUMENTS

| | | |
|---|---|---|
| WO | 0196723 A1 | 12/2001 |
| WO | 2005/119029 A1 | 12/2005 |

\* cited by examiner

TURBINE INLET AIR HEAT PUMP-TYPE SYSTEM

TECHNICAL FIELD

The present application relates generally to gas turbine engines and more particularly relates to a turbine inlet air heat pump-type system that concurrently provides heating to the turbine inlet air and supplies chilled water to charge a thermal energy storage tank.

BACKGROUND OF THE INVENTION

Air chilling systems are often used with gas turbines to cool the inlet air temperature. Depending upon the ambient temperature, the use of the chilling systems with gas turbine engines may increase overall power output by a significant percentage. Specifically, the power output of the gas turbine is almost in reverse proportion to the inlet air temperature over a wide temperature range. For example, a known gas turbine may produce only about 154 megawatts of power at an ambient temperature of about 83 degrees Fahrenheit (about 28.3 degrees Celsius) but may produce about 171.2 megawatts of power at about 50 degrees Fahrenheit (about 10 degrees Celsius), an increase of more than about eleven percent. Likewise, the chilling systems may be run to temper the cold inlet air with waste heat in cooler ambient temperatures so as to provide efficient part load operation for the gas turbine.

In locations or times of the year with considerable day to night temperature swings, inlet air heating may be used for part load operations or anti-icing control at night while cooling may be needed for efficient operation during the day. Both heating and cooling operations, however, generally involve an external energy source. This parasitic power drain thus may compromise somewhat the overall turbine output and efficiently.

There is thus a desire for improved gas turbine inlet air heating and cooling systems. Such heating and cooling systems should provide for advance heating and cooling of gas turbine inlet air temperatures while increasing overall system output and efficiency.

SUMMARY OF THE INVENTION

The present application thus describes a heating and cooling system for inlet air of a turbine compressor. The heating and cooling system may include a thermal energy storage tank charging loop, a cooling loop in communication with the thermal energy storage tank charging loop, and a heating loop in communication with the cooling loop and the inlet air of the turbine compressor.

The present application further describes a method of operating an inlet air heating and cooling system for a compressor inlet as a heat pump. The method may include the steps of operating a chiller to charge a thermal energy storage tank, directing waste heat from the chiller to a heat exchanger, heating a fluid in communication with the compressor inlet and the waste heat of the chiller in the heat exchanger, and heating the inlet air about the compressor with the waste heat of the chiller.

The present application further describes a heating and cooling system for inlet air of a gas turbine compressor. The heating and cooling system may include a thermal energy storage tank charging loop with a thermal energy storage tank and a chiller evaporator. A cooling loop may be in communication with the thermal energy storage tank charging loop. The cooling loop may include a chiller condenser and a heat recovery heat exchanger. A heating loop may be in communication with the cooling loop and the inlet air of the gas turbine compressor. The heating loop may include a fluid coil positioned about the turbine compressor and in communication with the heat recovery heat exchanger.

These and other features of the present application will become apparent to one of ordinary skill in the art upon review of the following detailed description when taken in conjunction with the several drawings and the appended claims.

DETAILED DESCRIPTION

Figure 1:
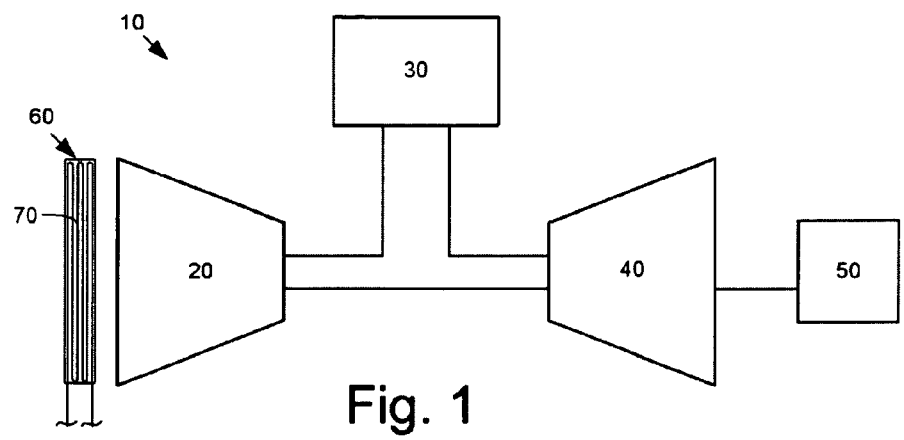
FIG. 1 is a schematic view of a gas turbine engine with an air chilling system.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a flow of fuel and ignites the mixture. (Although only a single combustor 30 is shown, the gas turbine engine 10 may include any number of combustors 30). The hot combustion gases are delivered in turn to a turbine 40. The turbine 40 drives the compressor 20 and an external load 50 such as an electrical generator and the like. The gas turbine engine 10 may use natural gas, various types of syngas, and other fuels. The gas turbine engine 10 may use other configurations and components herein.

In this example, the gas turbine engine 10 further includes an inlet air heating and cooling system 60. The inlet air heating and cooling system 60 may be positioned about the compressor 20 and heats or cools the incoming airflow to a desired temperature. The inlet air heating and cooling system 60 includes a cold/hot water coil 70. Hot or cold water flows through the coil 70 and exchanges heat with the incoming airflow. The inlet air heating and cooling system 60 may use any type of heat exchange device therein. As described above, cold water generally may be provided by a refrigeration plant while hot water may be provided via system waste heat or from another source.

It is important to note that the terms "hot", "warm", "cold", and "cool", are used in a relative sense. No limitation on the applicable temperature range is intended herein.

Figure 2:
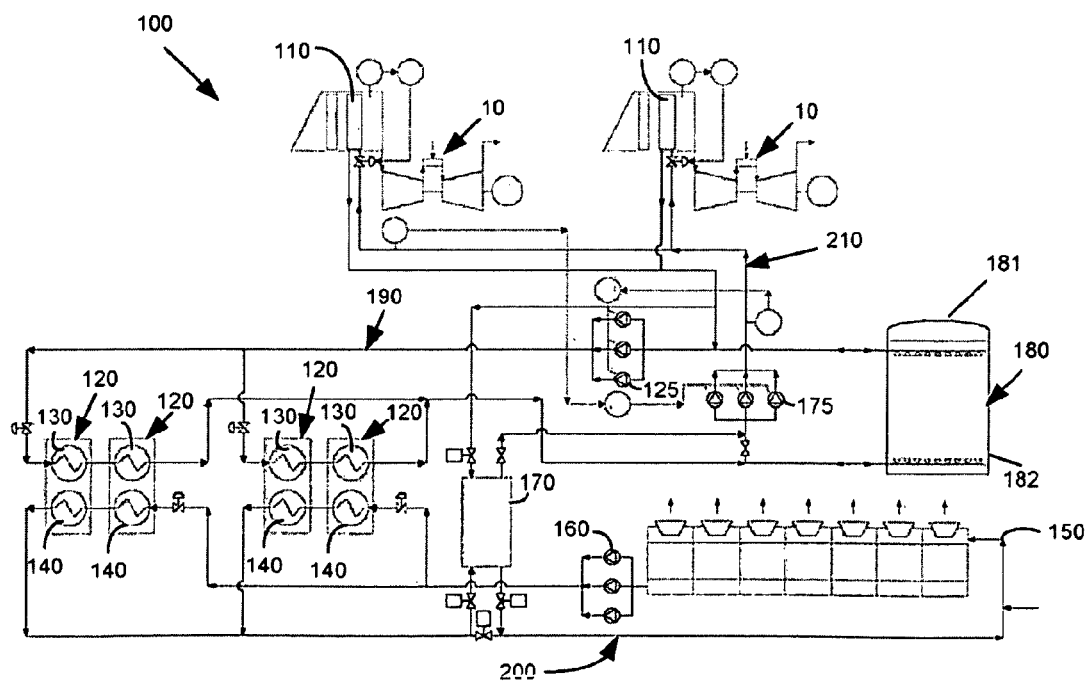
FIG. 2 is a schematic view of a gas turbine inlet air heating and cooling system configured to operate as an inlet air heat pump-type system as is described herein.

FIG. 2 shows an integrated gas turbine inlet air heating and cooling system 100 as is described herein. The gas turbine inlet air heating and cooling system 100 may be used with any number of gas turbine engines 10. As described above, a cold/hot water coil 110 may be positioned about the compressor 20 of each gas turbine engine 10. The cold/hot water coil 110 heats or cools the inlet air via a water stream running therethrough as is described above. Other types of heat exchange devices may be used herein.

In cooling mode, the cold/hot water coil 110 may be in communication with a water chiller 120. The water chiller 120 may be a mechanical chiller, an absorption chiller, or any conventional type of chilling device. As is known, the water chiller 120 provides cold water to the cold/hot water coil 110 where heat is exchanged with the incoming airflow. After exchanging heat, the now warmer water is then generally returned to the water chiller 120. The cold/hot water coil 110 may be in communication with the water chiller 120 via a primary water pump 125. Any number of water chillers 120 and primary water pumps 125 may be used.

Each water chiller 120 generally includes an evaporator 130 and a condenser 140. Cooling water for the chiller condenser 140 may be provided by a cooling tower 150 via one or more condenser water pumps 160. Other types of water sources may be used herein. As is known, the cooling tower 150 may function as a heat sink or a heat source depending upon the overall system heat balance. Other types of heat exchange devices may be used herein.

Warm water also may be provided to the cold/hot water coil 110. Warm water may be provided via waste heat or an external source. In this example, a heat recovering heat exchanger 170 may be used. Any type of heat exchange device may be used herein. Warm water from the condenser 140 of the chiller 120 may pass through the heat recovery heat exchanger 170 on its way back to the cooling tower 150 and exchange heat with a loop in communication with the cold/hot water coil 110 as will be described in more detail below. Other sources of waste heat also may be used with the heat recovery heat exchanger 170, i.e., heat rejected from the bottoming cycle, the generator, lube oil waste heat, or any other heat source. The heat recovery heat exchanger 170 may be in communication with the cold/hot water coil 110 via a secondary water pump 175. Any number of secondary water pumps 175 may be used.

The inlet air heating and cooling system 100 also may include a thermal energy storage tank 180. The thermal energy storage tank 180 may be a conventional stratified water thermal storage system. Other types of liquids also may be used herein. Warm water rises to a top portion of the tank 180 while cooler water sinks to a bottom portion 182 of the tank 180. Other types of thermal storage systems may be used herein. Any number of thermal energy storage tanks 180 may be used herein.

In heat pump mode, the inlet air heating and cooling system 100 may include a number of thermal loops. The first loop may be a thermal energy storage tank charging loop 190. The thermal energy storage tank charging loop 190 may connect the top 181 of the thermal energy storage tank 180 with the evaporators 130 of the water chillers 120 via the primary water pump 125. The chilled water then may flow directly back to the bottom 182 of the thermal energy storage tank 180. The chilled water thus may be stored in the thermal energy storage tank 180 for later use. For example, the chilled water may be used in the cold/hot water coil 110 to provide inlet air chilling during the day.

The inlet air heating and cooling system 100 also may include a heat source loop or a cooling loop 200. The cooling loop 200 may include the condensers 140 of the water chillers 120, the heat recovery heat exchanger 170, and the cooling tower 150 via the condenser water pump 160. Cool water may be pumped from the cooling tower 150 to the condensers 140 of the water chillers 120 for heat exchange therein. The waste heat added to the water stream from the condensers 140 then may be exchanged in the heat recover heat exchanger 170 as will be described in more detail below before returning to the cooling tower 150.

The inlet air heating and cooling system 100 further may include a heating loop 210. The heating loop 210 may connect the cold/hot water coils 110 with the heat recovery heat exchanger 170 via the secondary water pump 175. The waste heat from the condensers 140 of the water chillers 120 thus may be exchanged in the heat recovery heat exchanger 170 and provided to the cold/hot water coils 110 so at to heat the incoming air streams about the compressors 20.

The inlet air heating and cooling system 100 thus may provide heating to the inlet of the compressors 130 while simultaneously supplying chilled water to the thermal energy storage tank 180 for later use. The waste heat from the condensers 140 of the water chillers 120 may be provided to the cold/hot water coil 110 so as to provide part load control of the overall gas turbine engine 10, anti-icing to the compressor 20 instead of the use of inlet bleed heat, freeze protection of the cold/hot water coils 110 without the use of anti-freeze, and freeze protection of the inlet filters instead of conventional inlet housing deicing techniques. The inlet air heating and cooling system 100 in this heat pump-type mode thus may be used during cold nights when inlet heat is useful for part load or anti-icing control while generating chilled water for use during the day. The inlet air heating and cooling system 100 thus provides inlet air heating without consumption of additional energy for efficient part loading. As such, parasitic power may be reduced while overall power generation may be increased.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A heating and cooling system for inlet air of a gas turbine compressor, comprising:
   one or more water chillers comprising an evaporator and a condenser;
   a thermal energy storage tank charging loop comprising the evaporator of the one or more water chillers;
   a cooling loop comprising the condenser of the one or more water chillers, wherein the cooling loop is in communication with the thermal energy storage tank charging loop via the one or more water chillers; and
   a heating loop in communication with the cooling loop via a heat exchanger such that waste heat from the condenser of the one or more water chillers is exchanged in the heat exchanger to the heat loop, wherein the heating loop is in communication with the inlet air of the turbine compressor.

2. The heating and cooling system for inlet air of claim 1, wherein the heating loop comprises a fluid coil positioned about the gas turbine compressor and in communication with the inlet air.

3. The heating and cooling system for inlet air of claim 1, wherein the cooling loop comprises a cooling tower.

4. The heating and cooling system for inlet air of claim 1, wherein the thermal energy storage tank charging loop comprises a thermal energy storage tank.

5. A method of operating an inlet air heating and cooling system for a compressor inlet as a heat pump, comprising:
   operating a chiller to charge a thermal energy storage tank;
   directing waste heat from the chiller to a heat exchanger;
   heating a fluid in communication with the compressor inlet and the waste heat of the chiller in the heat exchanger; and
   heating the inlet air about the compressor with the waste heat of the chiller.

6. The method of claim 5, wherein the step of operating a chiller to charge a thermal energy storage tank comprises circulating a fluid about a chiller evaporator and a thermal energy storage tank.

7. The method of claim 5, wherein the step of directing waste heat from the chiller to a heat exchanger comprises circulating a fluid about a chiller condenser and a heat recovery heat exchanger.

8. The method of claim 7, wherein the step of heating a fluid in communication with the compressor inlet with the waste heat of the chiller in a heat exchanger comprises heating the fluid in the heat recovery heat exchanger.

9. The method of claim 5, wherein the step of heating the inlet air about the compressor with the waste heat of the chiller comprises heating the inlet air via a fluid coil.

10. A heating and cooling system for inlet air of a gas turbine compressor, comprising:
- a thermal energy storage tank charging loop with a thermal energy storage tank and a chiller evaporator;
- a cooling loop in communication with the thermal energy storage tank charging loop;
- the cooling loop comprising a chiller condenser and a heat recovery heat exchanger;
- a heating loop in communication with the cooling loop and the inlet air of the gas turbine compressor; and
- the heating loop comprising a fluid coil positioned about the turbine compressor and in communication with the heat recovery heat exchanger.

11. The heating and cooling system for inlet air of claim 10, wherein the cooling loop comprises a cooling tower.

12. The heating and cooling system for inlet air of claim 10, wherein the thermal energy storage tank charging loop comprises a primary water pump.

13. The heating and cooling system for inlet air of claim 10, wherein the cooling loop comprises a secondary water pump.

14. The heating and cooling system for inlet air of claim 10, wherein the heating loop comprises a condenser water pump.

\* \* \* \* \*